United States Patent
Balasubramanian et al.

(10) Patent No.: US 8,385,061 B2
(45) Date of Patent: Feb. 26, 2013

(54) SYSTEM AND METHOD FOR IMPLEMENTING A META-DISK AGGREGATION MODEL FOR STORAGE CONTROLLERS

(75) Inventors: Sridhar Balasubramanian, Wichita, KS (US); Kenneth Hass, Longmont, CO (US)

(73) Assignee: LSI Corporation, Milpitas, CA (US)

( * ) Notice: Subject to any disclaimer, the term of this patent is extended or adjusted under 35 U.S.C. 154(b) by 1582 days.

(21) Appl. No.: 11/585,524

(22) Filed: Oct. 24, 2006

(65) Prior Publication Data

US 2008/0098171 A1    Apr. 24, 2008

(51) Int. Cl.
H05K 5/00 (2006.01)
G06F 12/00 (2006.01)
G06F 3/00 (2006.01)
G06F 13/36 (2006.01)

(52) U.S. Cl. ......... 361/679.33; 361/679.36; 361/679.37; 361/679.38; 361/679.39; 711/211; 711/213; 710/3; 710/4; 710/9; 710/26; 710/208

(58) Field of Classification Search .. 361/679.31–679.4, 361/679.55–679.6, 724–727, 683, 684, 685, 361/686, 679.33; 439/157, 60, 152–153, 439/327, 328, 331; 369/75.11, 75.21, 76, 369/77.11, 77.21, 78, 79, 80, 81, 82; 711/203–214; 710/1–10, 26, 208
See application file for complete search history.

(56) References Cited

U.S. PATENT DOCUMENTS

| | | | |
|---|---|---|---|
| 5,506,750 A | 4/1996 | Carteau et al. | |
| 6,988,171 B2 | 1/2006 | Beardsley et al. | |
| 2003/0030952 A1* | 2/2003 | Larson et al. | 361/58 |
| 2003/0030978 A1* | 2/2003 | Garnett et al. | 361/687 |
| 2003/0070043 A1 | 4/2003 | Merkey | |
| 2004/0083325 A1 | 4/2004 | Rabinovitz et al. | |
| 2004/0148460 A1 | 7/2004 | Steinmetz et al. | |
| 2005/0102433 A1* | 5/2005 | Balasubramanian et al. | 710/1 |
| 2005/0219810 A1 | 10/2005 | Carlson et al. | |

FOREIGN PATENT DOCUMENTS

| | | |
|---|---|---|
| JP | H04-153727 A | 5/1992 |
| JP | H07-6004 A | 1/1995 |
| JP | 2000-508458 A | 7/2000 |
| JP | 2005-322385 A | 11/2005 |
| WO | WO2006065281 | 6/2006 |

OTHER PUBLICATIONS

EPO Supplementary European Search Report; EPO Application No. EP 07839105; May 6, 2010.
First Official Action of Substantive Examination, and translation, SIPO, Jun. 28, 2010.

* cited by examiner

*Primary Examiner* — Jayprakash N Gandhi
*Assistant Examiner* — Jerry Wu
(74) *Attorney, Agent, or Firm* — Suiter Swantz pc llo

(57) ABSTRACT

The present invention is a system for implementing a meta-disk aggregation model for storage controllers. The system includes a storage controller configured for communicatively coupling with a server. The system further includes a meta-disk drive group having a plurality of disk drives, the meta-disk drive group configured for being communicatively coupled with the storage controller, each of the plurality of disk drives including a drive interface connector. Additionally, each drive interface connector of the plurality of disk drives of the meta-disk drive group is configured for being communicatively coupled to each of the remaining drive interface connectors of the plurality of disk drives, thereby allowing the plurality of disk drives to communicate as a single device with the storage controller.

19 Claims, 5 Drawing Sheets

SYSTEM AND METHOD FOR IMPLEMENTING A META-DISK AGGREGATION MODEL FOR STORAGE CONTROLLERS

FIELD OF THE INVENTION

The present invention relates to the field of electronic data storage and particularly to a meta-disk aggregation model for storage controllers.

BACKGROUND OF THE INVENTION

A number of current disk arrays may be capable of handling heterogeneous drive types across drive enclosures that are attached to back-end controller channels in order to provide volumes and volume groups made up of disk volume groups. In addition, current storage system controllers provide the capability to create volumes and volume groups by combining one or more drives depending on the required RAID level. However, with current systems, disk I/O (input/output) performance may be limited by factors such as: number of drives in the volume group; RAID level; number of volumes within the volume group; and size of volumes and volume groups.

Therefore, it may be desirable to provide a meta-disk aggregation model for storage controllers which addresses the above-referenced problems and limitations of the current solutions by promoting improved disk I/O throughput and by further promoting increased system storage density.

SUMMARY OF THE INVENTION

Accordingly, an embodiment of the present invention is directed to a system for implementing a meta-disk aggregation model for storage controllers, including: a storage controller configured for communicatively coupling with a server; and a meta-disk drive group including a plurality of disk drives, the meta-disk drive group configured for being communicatively coupled with the storage controller, each of the plurality of disk drives including a drive interface connector, wherein each drive interface connector of the plurality of disk drives of the meta-disk drive group is configured for being communicatively coupled to each of the remaining drive interface connectors of the plurality of disk drives, thereby allowing the plurality of disk drives to communicate as a single device with the storage controller.

A further embodiment of the present invention is directed to a method for implementing a meta-disk aggregation model for storage controllers, including: providing a storage controller configured for communicatively coupling with a server; providing a meta-disk drive group, the meta-disk drive group including a plurality of disk drives; and configuring the meta-disk drive group for being communicatively coupleable as a single device with the storage controller.

An additional embodiment of the present invention is directed to a system for implementing a meta-disk aggregation model for storage controllers, including: a storage controller configured for communicatively coupling with a server; and a meta-disk drive group including a plurality of disk drives, each disk drive of the plurality of disk drives of the meta-disk drive group having a drive carrier assembly including a drive pull mechanism, each drive pull mechanism configured for allowing disk drive and drive carrier assembly removal from a drive enclosure, each drive pull mechanism of the meta-disk drive group being interlocked and synchronized with remaining drive pull mechanisms of the meta-disk drive group, thereby allowing for coordinated removal of each disk drive and drive carrier assembly from the drive enclosure, each drive pull mechanism of the meta-disk drive group including an extraction lock and an extraction lever, the meta-disk drive group configured for being communicatively coupled with the storage controller, wherein a single device address is assigned to the meta-disk drive group with the plurality of disk drives of the meta-disk drive group being configured to communicate as a single device with the storage controller.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
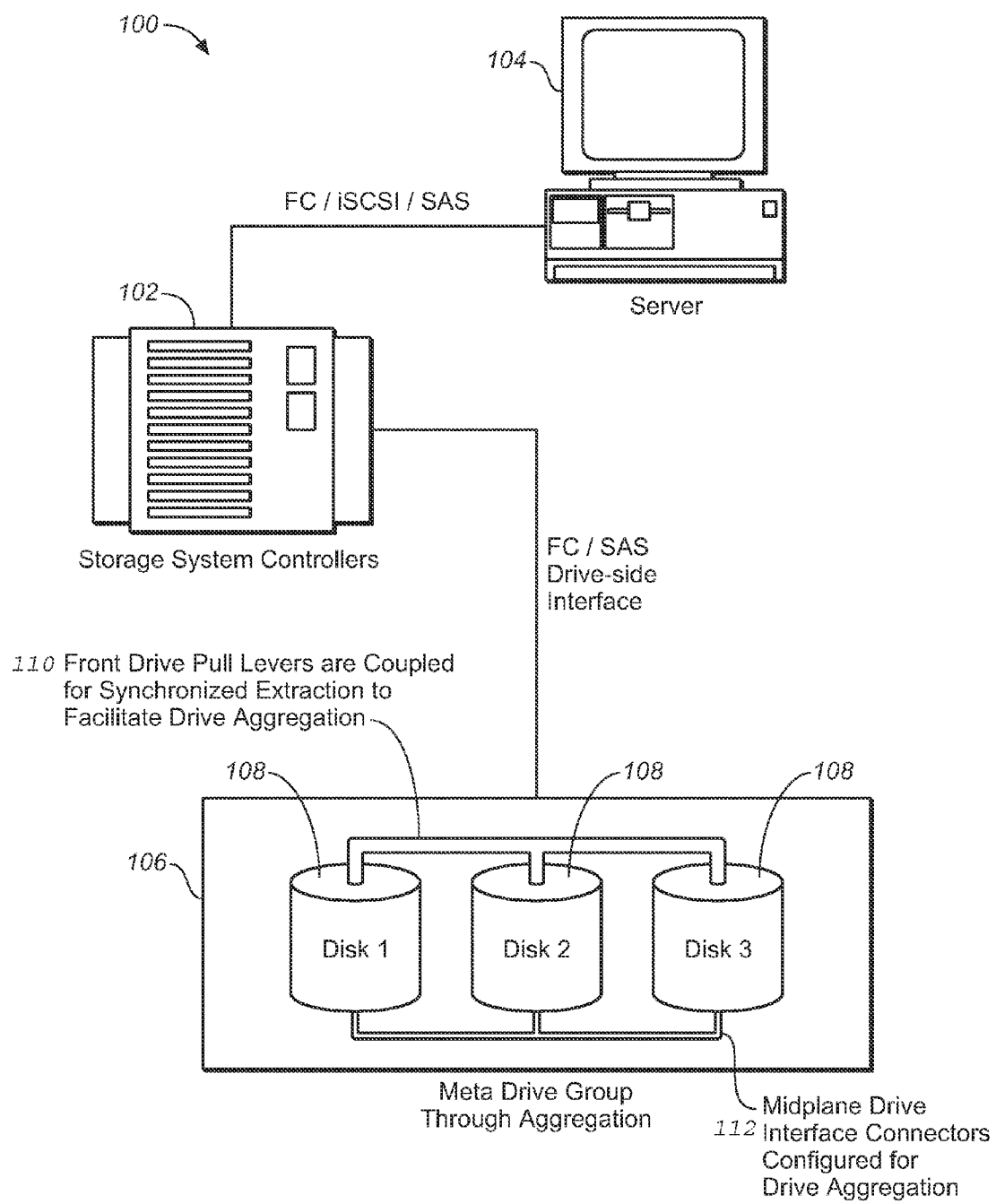
FIG. 1 is an illustration of a system implementing a meta-disk aggregation model for storage controllers in accordance with an exemplary embodiment of the present invention.

FIG. 1 illustrates a system 100 implementing a meta-disk aggregation model in accordance with an exemplary embodiment of the present invention. In a present embodiment, the system 100 includes a storage controller 102. For example, the storage controller 102 may be an Engenio™ storage controller. In the exemplary embodiment, the storage controller 100 may be configured for communicatively coupling with a server 104, such as via a Fibre Channel (FC), internet SCSI (iSCSI), or serial attached SCSI (SAS) connection.

In a current embodiment, the system 100 further includes a meta-disk drive group 106 including a plurality of disk drives 108. In the exemplary embodiment, the meta-disk drive group 106 is configured for being communicatively coupled with the storage controller 102, such as via a Fibre Channel (FC) or serial attached SCSI (SAS) connection. In present embodiments, the plurality of disk drives 108 of the meta-disk drive group 106 are configured for communicating as a single device with the storage controller 102. For instance, although the meta-disk drive group 106 includes a plurality of disk drives 108, the storage controller 102 interprets the plurality of disk drives as being a single device (ex.-a single meta-disk spindle) thus, a single device address may be assigned to the meta-disk drive group 106, thereby promoting increased I/O throughput and increased storage density for the system 100. In exemplary embodiments, I/O traffic may be directed to the single device address of the meta-disk drive group via a back-end channel of the storage controller 102. Exemplary embodiments may include front drive pull levers coupled for synchronized extraction to facilitate drive aggregation (e.g., 110). Exemplary embodiments may further include midplane drive interface connectors (e.g., 112) configured for drive aggregation.

Figure 2:
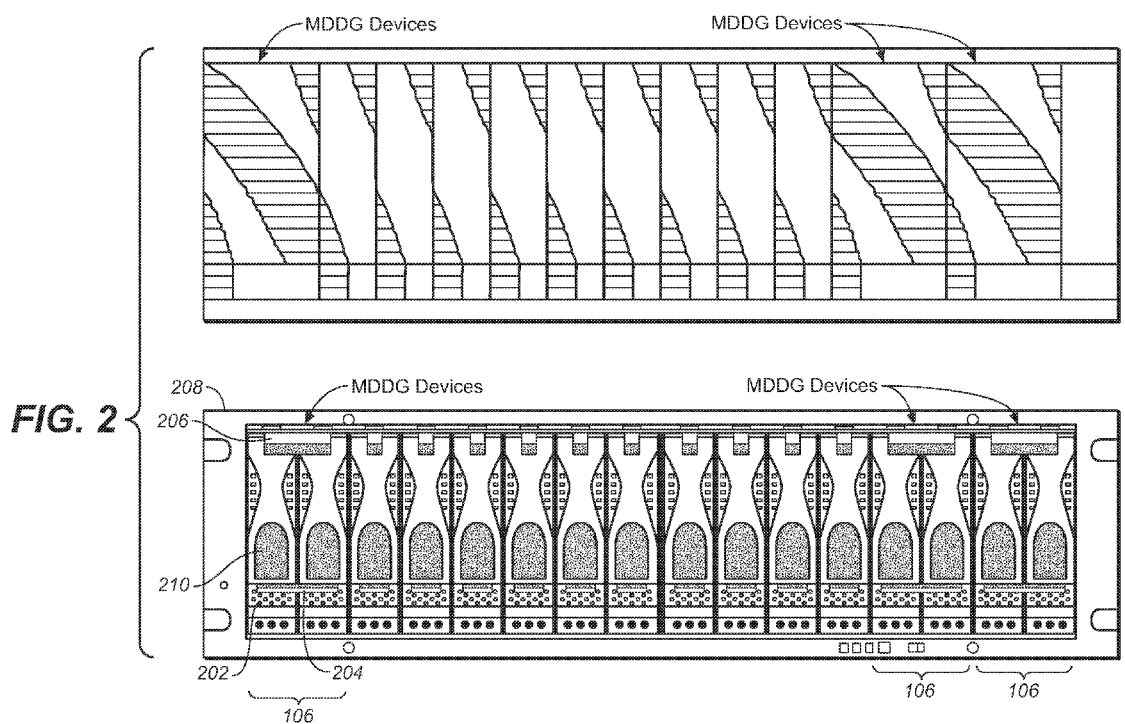
FIG. 2 is an illustration of a drive interface connector of a disk drive included in a system implementing a meta-disk aggregation model for storage controllers in accordance with an exemplary embodiment of the present invention.

In exemplary embodiments, as shown in FIG. 2, each disk drive included in the plurality of disk drives 108 of the meta-disk drive group includes a drive carrier assembly 202 having a drive pull mechanism 204. In the present embodiment, each drive pull mechanism 204 includes an extraction lock 206 for securing the drive carrier assembly 202 within a drive enclosure 208, said extraction lock being disengageable to allow for extraction of the drive carrier assembly and disk drive from the drive enclosure. In additional embodiments, each drive pull mechanism 204 also includes an extraction lever 210 for promoting extraction of the drive carrier assembly 202 and disk drive from the drive enclosure. In exemplary embodiments, each of the drive pull mechanisms 204 of the disk drives 108 of the meta-disk drive group 106 are interlocked and synchronized so that, for example, while a user is extracting or removing a drive carrier assembly 202 and disk drive 108 of the meta-disk drive group 106 from the drive enclosure, each of the remaining drive carrier assemblies and disk drives 108 of meta-disk drive group 106 are also extracted. As shown in FIG. 2, multiple meta-disk drive groups 106 may be enclosed by a single drive enclosure 208.

Figure 5B:
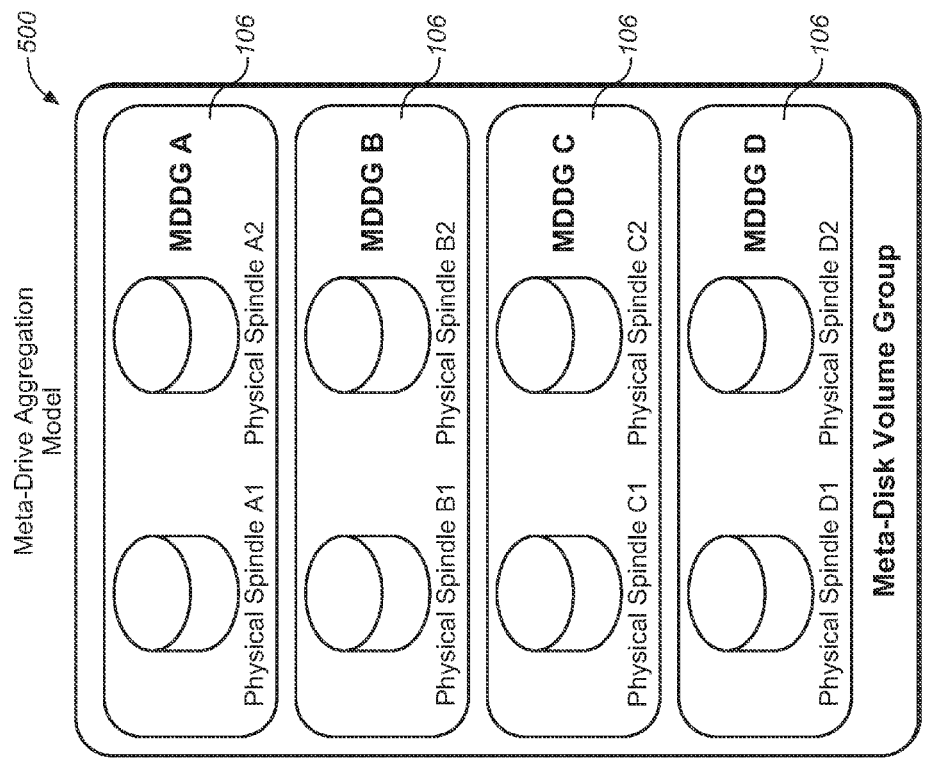
FIG. 5B is an illustration of a system implementing a meta-drive aggregation model for storage controllers in accordance with an exemplary embodiment of the present invention.
Figure 5A:
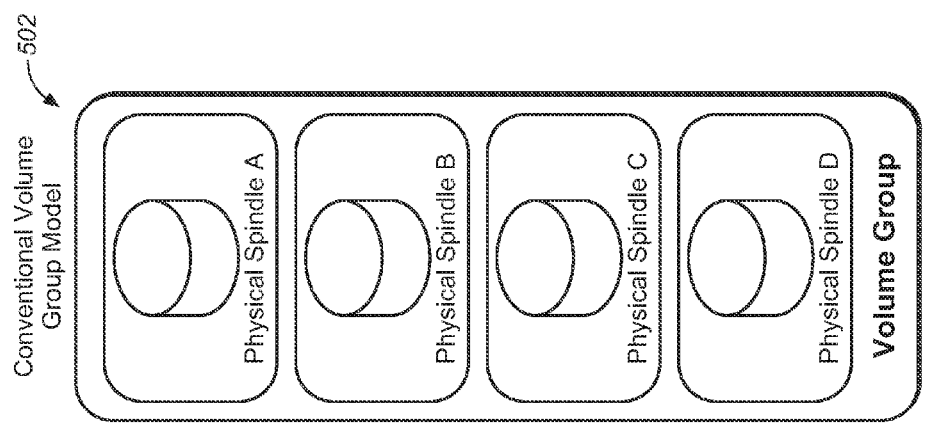
FIG. 5A is an illustration of a conventional prior art volume group model.

In further embodiments, the disk drives 108 may be aggregated to a desired capacity to form a meta-disk drive group 106 having a desired number of disk drives. In additional embodiments, as shown in FIG. 5B, multiple meta-disk drive groups 106 may be included in the system 100, for providing a volume group 500 which promotes increased capacity and I/O performance bandwidth over a conventional prior art volume group 502 (see FIG. 5A).

Figure 3:
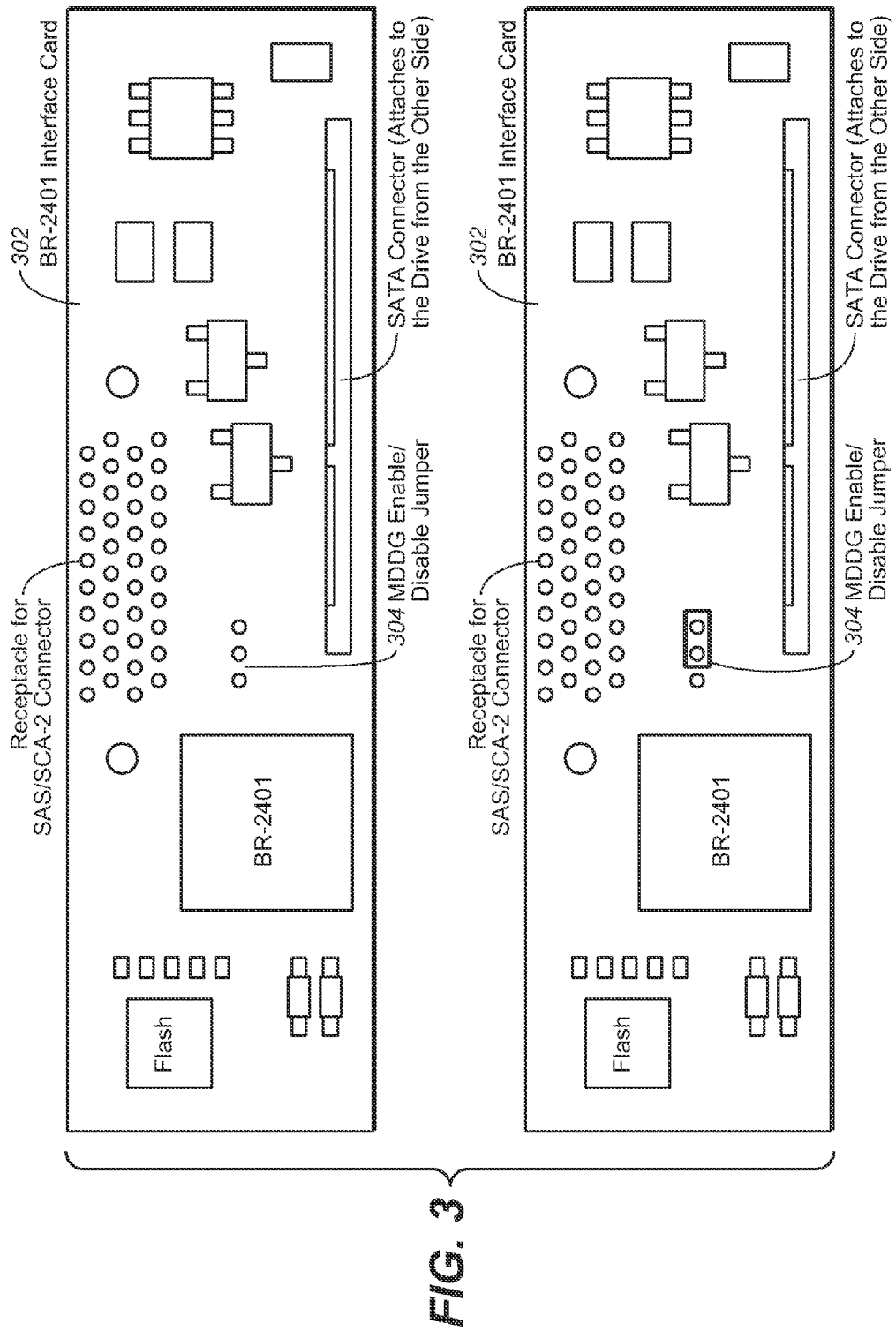
FIG. 3 is an illustration of drive pull mechanisms for disk drives included in a system implementing a meta-disk aggregation model for storage controllers in accordance with an exemplary embodiment of the present invention.

In additional embodiments, as shown in FIG. 3, each of the plurality of disk drives 108 of the meta-disk drive group 106 include a drive interface connector 302. Further, each of the plurality of disk drives 108 of the meta-disk drive group 106 include on-interposer electronics, such as a jumper 304 (ex— an interposer jumper), for communicatively coupling each of the plurality of disk drives of the meta-disk drive group via the drive interface connectors 302 of the disk drives. In exemplary embodiments, each jumper 304 is configured for indicating aggregation of the plurality of disk drives 108 of the meta-disk drive group 106 to the storage controller 102. For instance, aggregation may be indicated to the storage controller during boot up (i.e., power on) of the storage controller or when device discovery is performed by the storage controller.

Figure 4:
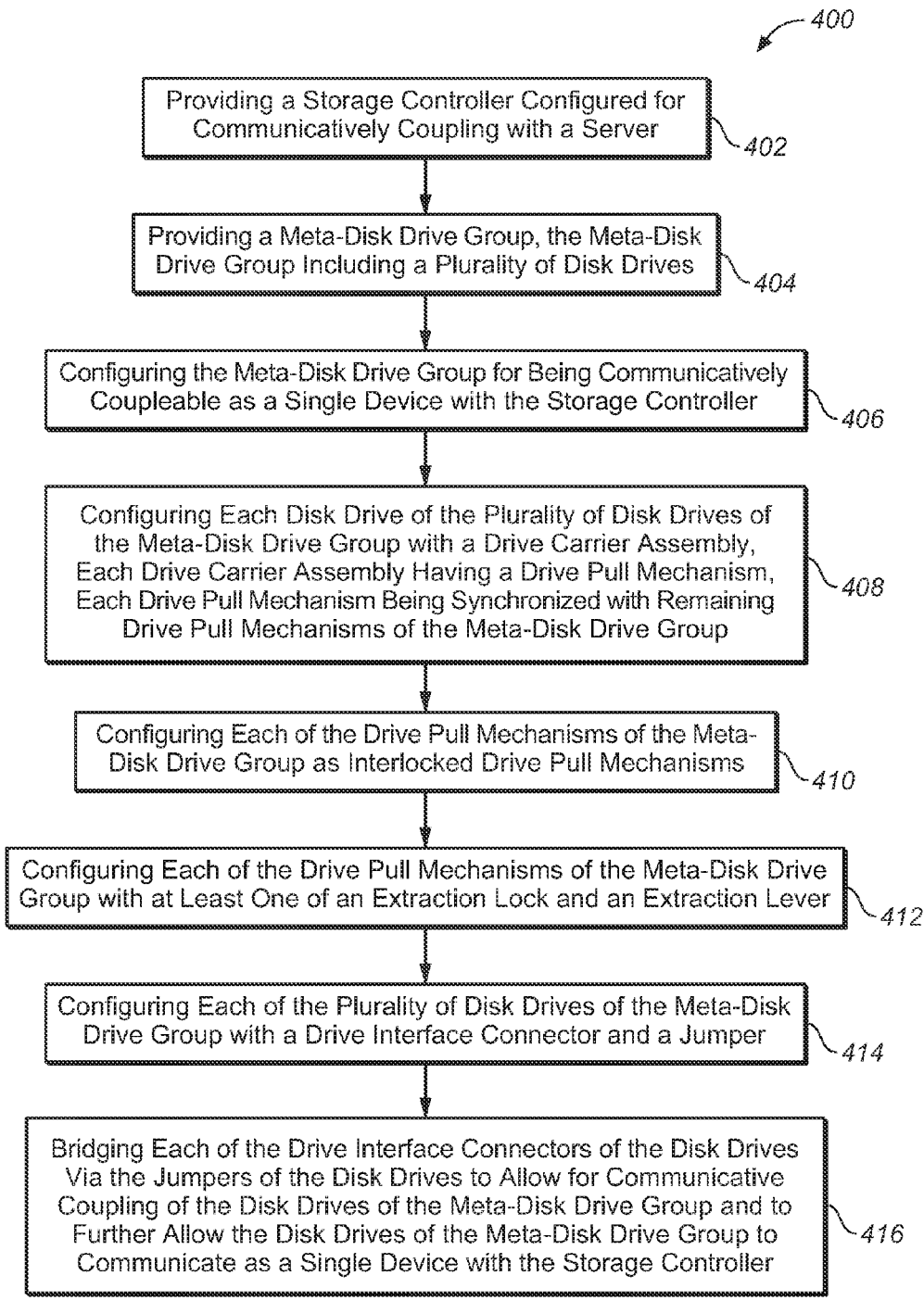
FIG. 4 is a flow chart illustrating a method for implementing a meta-disk aggregation model for storage controllers in accordance with an exemplary embodiment of the present invention.

FIG. 4 is a flowchart illustrating a method for implementing a meta-disk aggregation model for storage controllers in accordance with an embodiment of the present invention. The method 400 includes the step of providing a storage controller configured for communicatively coupling with a server 402. The method 400 further includes the step of providing a meta-disk drive group, the meta-disk drive group including a plurality of disk drives 404. The method 400 further includes the step of configuring the meta-disk drive group for being communicatively coupleable as a single device with the storage controller 406. The method 400 further includes the step of configuring each disk drive of the plurality of disk drives of the meta-disk drive group with a drive carrier assembly, each drive carrier assembly having a drive pull mechanism, each drive pull mechanism being synchronized with remaining drive pull mechanisms of the meta-disk drive group 408. The method 400 further includes the step of configuring each of the drive pull mechanisms of the meta-disk drive group as interlocked drive pull mechanisms 410. The method 400 further includes the step of configuring each of the drive pull mechanisms of the meta-disk drive group with at least one of an extraction lock and an extraction lever 412. The method 400 further includes the step of configuring each of the plurality of disk drives of the meta-disk drive group with a drive interface connector and a jumper 414. The method 400 further includes the step of bridging each of the drive interface connectors of the disk drives via the jumpers of the disk drives to allow for communicative coupling of the disk drives of the meta-disk drive group and to further allow the disk drives of the meta-disk drive group to communicate as a single device with the storage controller 416.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A system, comprising:
   a storage controller configured for communicatively coupling with a server; and a meta-disk volume group including a plurality of meta-disk drive groups, each meta-disk drive group including a plurality of disk drives, each meta-disk drive group configured for being communicatively coupled with the storage controller, each of the plurality of disk drives including a drive interface connector configured for aggregation of the plurality of disk drives of each meta-disk drive group such that a single device address is assigned to each meta-disk drive group, each disk drive of the plurality of disk drives being enclosed by a particular drive carrier assembly configured to be inserted into or extracted from a slot of a single drive enclosure, whereby each meta-disk drive group includes an extractor for synchronized extraction of the meta-disk drive group's associated drive carrier assemblies from the single drive enclosure in a single extraction, wherein each of the plurality of disk drives includes a meta-disk drive group enable/disable jumper configured for being communicatively coupled with each disk drive of the plurality of disk drives via the drive interface connector, each drive interface connector of the plurality of disk drives of each meta-disk drive group configured for being communicatively coupled to each of the remaining drive interface connectors of the plurality of disk drives, thereby allowing the plurality of disk drives to communicate as a single device with the storage controller through the use of the single device address assigned to each meta-disk drive group, wherein the single drive enclosure encloses the plurality of meta-disk drive groups of the meta-disk volume group, wherein the storage controller is configured to communicate with a plurality of meta-disk drive groups or with at least one meta-disk drive group and at least one disk drive, wherein input/output (I/O) traffic is directed to the single device address of each meat-disk drive group of the meta-disk volume group via a back-end channel of the storage controller, and wherein the meta-disk volume group has an input/output bandwidth and storage density greater than an input/output bandwidth and storage density of a volume group having a same number of individual disk drives as a number of meta-disk drive groups of the meta-disk volume group.

2. The system of claim 1, wherein the extractor of the meta-disk drive group includes at least two drive pull mechanisms, wherein each disk drive of the plurality of disk drives of each meta-disk drive group includes a drive carrier assembly having a drive pull mechanism, each drive pull mechanism configured for allowing disk drive and drive carrier assembly removal from a single drive enclosure, each drive pull mechanism of a particular meta-disk drive group being synchronized with remaining drive pull mechanisms of the particular meta-disk drive group, thereby allowing for coordinated removal of all disk drives and drive carrier assemblies of the particular meta-disk drive group from the single drive enclosure in a single extraction.

3. The system of claim 2, wherein each of the drive pull mechanisms of each meta-disk drive group are interlocked.

4. The system of claim 3, wherein each of the drive pull mechanisms of each meta-disk drive group include an extraction lock.

5. The system of claim 4, wherein each of the drive pull mechanisms of each meta-disk drive group include an extraction lever.

6. The system of claim 1, wherein each of the plurality of disk drives of each meta-disk drive group includes on-interposer electronics.

7. The system of claim 6, wherein on-interposer electronics for each of the plurality of disk drives of the meta-disk drive group includes meta-disk drive group enable/disable jumper for communicatively coupling each of the plurality of disk drives of the meta-disk drive group via the drive interface connectors of the disk drives.

8. The system of claim 7, wherein the meta-disk drive group enable/disable jumper for each of the plurality of disk drives of the meta-disk drive group is configured for indicating aggregation of the plurality of disk drives of the meta-disk drive group to the storage controller.

9. The system of claim 8, wherein aggregation is indicated during at least one of storage controller boot up and storage controller device discovery.

10. A method, comprising:
providing a storage controller configured for communicatively coupling with a server;
providing a plurality of meta-disk drive groups of a meta-disk volume group, the meta-disk drive group including a plurality of disk drives;
configuring the storage controller to communicate with a plurality of meta-disk drive groups or with at least one meta-disk drive group and at least one disk drive;
configuring each meta-disk drive group as being assigned a single device address;
configuring each meta-disk drive group as being communicatively coupled with the storage controller, each of the plurality of disk drives including a jumper configured for being communicatively coupled with each disk drive of the plurality of disk drives via a drive interface connector;
configuring each drive interface connector of the plurality of disk drives of each meta-disk drive group for being communicatively coupled to each of the remaining drive interface connectors of the plurality of disk drives, thereby allowing the plurality of disk drives to communicate as a single device with the storage controller through the use of the single device address assigned to the meta-disk drive group;
configuring the plurality of disk drives of each meta-disk drive group to communicate as a single device with the storage controller;
configuring each disk drive of the plurality of disk drives to be enclosed by a particular drive carrier assembly configured to be inserted into or extracted from a slot of a single drive enclosure, whereby each meta-disk drive group includes an extractor for synchronized extraction of the meta-disk drive group's associated drive carrier assemblies from the single drive enclosure in a single extraction; and
providing a single drive enclosure for enclosing the plurality of meta-disk drive groups of the meta-disk volume group,
wherein input/output traffic is directed to the single device address of each meta-disk drive group of the meta-disk volume group via a back-end channel of the storage controller, and
wherein the meta-disk volume group has an input/output bandwidth and storage density greater than an input/output bandwidth and storage density of a volume group having a same number of individual disk drives as a number of meta-disk drive groups of the meta-disk volume group.

11. The method of claim 10, wherein the extractor of the meta-disk drive group includes at least two drive pull mechanisms, the method further comprising:

configuring each disk drive of the plurality of disk drives of each meta-disk drive group with a drive carrier assembly, each drive carrier assembly having a drive pull mechanism, each drive pull mechanism of a particular meta-disk drive group configured for allowing disk drive and drive carrier assembly removal from a single drive enclosure, each drive pull mechanism being synchronized with remaining drive pull mechanisms of the particular meta-disk drive group, thereby allowing for coordinated removal of all disk drives and drive carrier assemblies of the particular meta-disk drive group from the single drive enclosure in a single extraction.

12. The method of claim 11, wherein providing a plurality of meta-disk drive groups of a meta-disk volume group further comprises:

configuring each of the drive pull mechanisms of the meta-disk drive group as interlocked drive pull mechanisms.

13. The method of claim 12, wherein providing a plurality of meta-disk drive groups of a meta-disk volume group further comprises:

configuring each of the drive pull mechanisms of the meta-disk drive group with at least one of an extraction lock and an extraction lever.

14. The method of claim 13, wherein configuring the meta-disk drive group for being communicatively coupleable as a single device with the storage controller further comprises:

bridging each of the drive interface connectors of the disk drives via the jumpers of the disk drives to allow for communicative coupling of the disk drives of the meta-disk drive group and to further allow the disk drives of the meta-disk drive group to communicate as a single device with the storage controller.

15. The method of claim 14, wherein the jumpers are configured for indicating to the storage controller aggregation of the plurality of disk drives of the meta-disk drive group.

16. A system, comprising:

a storage controller configured for communicatively coupling with a server; and a meta-disk volume group including a plurality of meta-disk drive groups, each meta-disk drive group including a plurality of disk drives, each meta-disk drive group configured for being communicatively coupled with the storage controller, each of the plurality of disk drives including a drive interface connector configured for aggregation of the plurality of disk drives of each meta-disk drive group such that a single device address is assigned to each meta-disk drive group, each disk drive of the plurality of disk drives being enclosed by a particular drive carrier assembly configured to be inserted into or extracted from a slot of a single drive enclosure, whereby each meta-disk drive group includes an extractor for synchronized extraction of the meta-disk drive group's associated drive carrier assemblies from the single drive enclosure in a single extraction, wherein the extractor of the meta-disk drive group includes at least two drive pull mechanisms, wherein each drive pull mechanism is associated with a particular drive carrier assembly of each disk drive, each drive pull mechanism configured for allowing disk drive and drive carrier assembly removal from a single drive enclosure, each drive pull mechanism of a particular meta-disk drive group being interlocked synchronized with remaining drive pull mechanisms of the particular meta-disk drive group, thereby allowing for coordinated removal of all disk drives and drive carrier assemblies of the particular meta-disk drive group from the single drive enclosure in a single extraction, wherein the extractor of the meta-disk drive group includes an extraction lock and an extraction lever, wherein each of the plurality of disk drives includes a jumper configured for being communicatively coupled with each disk drive of the plurality of disk drives via the drive interface connector, each drive interface connector of the plurality of disk drives of each meta-disk drive group configured for being communicatively coupled to each of the remaining drive interface connectors of the plurality of disk drives, thereby allowing the plurality of disk drives to communicate as a single device with the storage controller through the use of the single device address assigned to each meta-disk drive group, wherein the single drive enclosure encloses the plurality of meta-disk drive groups of the meta-disk volume group, wherein the storage controller is configured to communicate with a plurality of meta-disk drive groups or with at least one meta-disk drive group and at least one disk drive, wherein input/output (I/O) traffic is directed to the single device address of each meat-disk drive group of the meta-disk volume group via a back-end channel of the storage controller, and wherein the meta-disk volume group has an input/output bandwidth and storage density greater than an input/output bandwidth and storage density of a volume group having a same number of individual disk drives as a number of meta-disk drive groups of the meta-disk volume group.

17. The system of claim 16, wherein each of the plurality of disk drives of the meta-disk drive group include a jumper for communicatively coupling each of the plurality of disk drives of the meta-disk drive group via drive interface connectors of each of the plurality of disk drives of the meta-disk drive group.

18. The system of claim 16, wherein the extraction lock is configured to disengage.

19. The system of claim 16, wherein the jumper is a meta-disk drive group enable/disable jumper.

* * * * *